R. BRAUN.
SYSTEM OF ELECTRICAL DISTRIBUTION.
APPLICATION FILED OCT. 3, 1906.

924,628.

Patented June 15, 1909.
3 SHEETS—SHEET 3.

WITNESSES:
C. L. Belcher
Otto S. Schairer

INVENTOR
Rudolf Braun
BY
Wesley G. Carr
ATTORNEY

UNITED STATES PATENT OFFICE.

RUDOLF BRAUN, OF MANCHESTER, ENGLAND, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

No. 924,628.

Specification of Letters Patent.

Patented June 15, 1909.

Application filed October 3, 1906. Serial No. 387,291.

*To all whom it may concern:*

Be it known that I, RUDOLF BRAUN, a subject of the German Emperor, and a resident of Manchester, in the county of Lancaster, England, have invented a new and useful Improvement in Systems of Electrical Distribution, of which the following is a specification.

This invention relates to systems of electrical distribution, and, in particular, to polyphase systems where the real and inductive load is variable, which is the case, for example, when induction motors are connected to the circuit. If these are of large size, as for instance, when used for the operation of winding engines or rolling mills, the load factor of the power station and also the total efficiency of the power plant will be rather small. Moreover, the variations in the voltage of the alternating current generators in the power station is considerable when an induction motor of large capacity is installed.

The object of the present invention is to avoid these difficulties by equalizing the variable load of the supply circuit and transforming it into a constant load on the power station and by minimizing the voltage variations so that, with a variable load on the supply circuit, the alternating current voltage of the generators can be maintained substantially constant or, with overloads, be even automatically increased in a desired degree.

According to this invention, a rotary converter is connected across the transmission conductors between the power station and the supply circuit. This machine will run at a constant speed which will depend upon the frequency of the circuit, and its direct current side is electrically connected to a direct current shunt wound dynamo-electric machine designed for the same voltage as the direct current side of the rotary converter. The shunt wound machine is coupled to a heavy fly-wheel and is constructed to run at as high a speed as possible, a suitable rheostat being included in its field magnet circuit.

This invention is, for the purpose of illustration, shown as applied to a three-phase system, in the accompanying drawings, of which—

Figure 1:
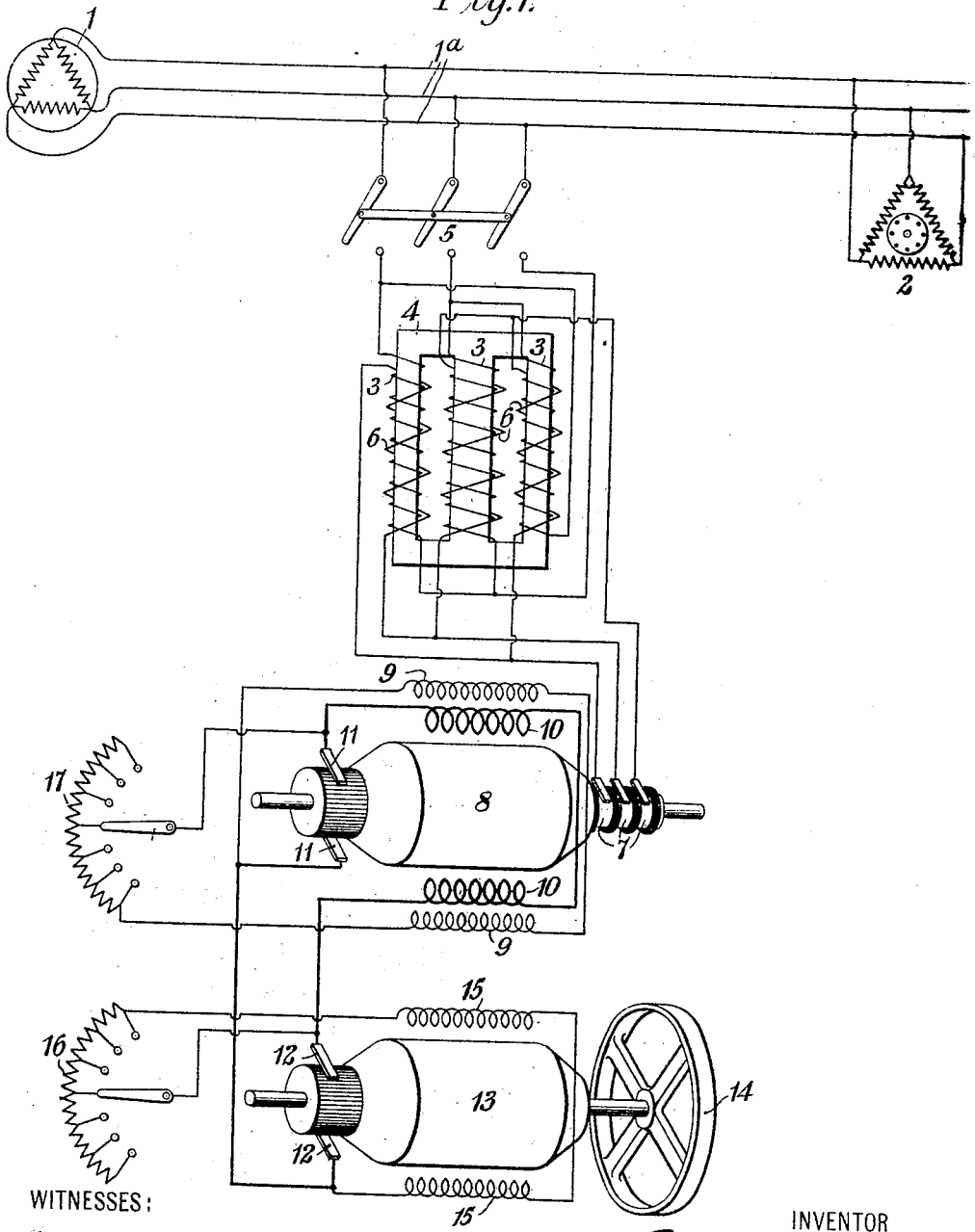
Figure 2:
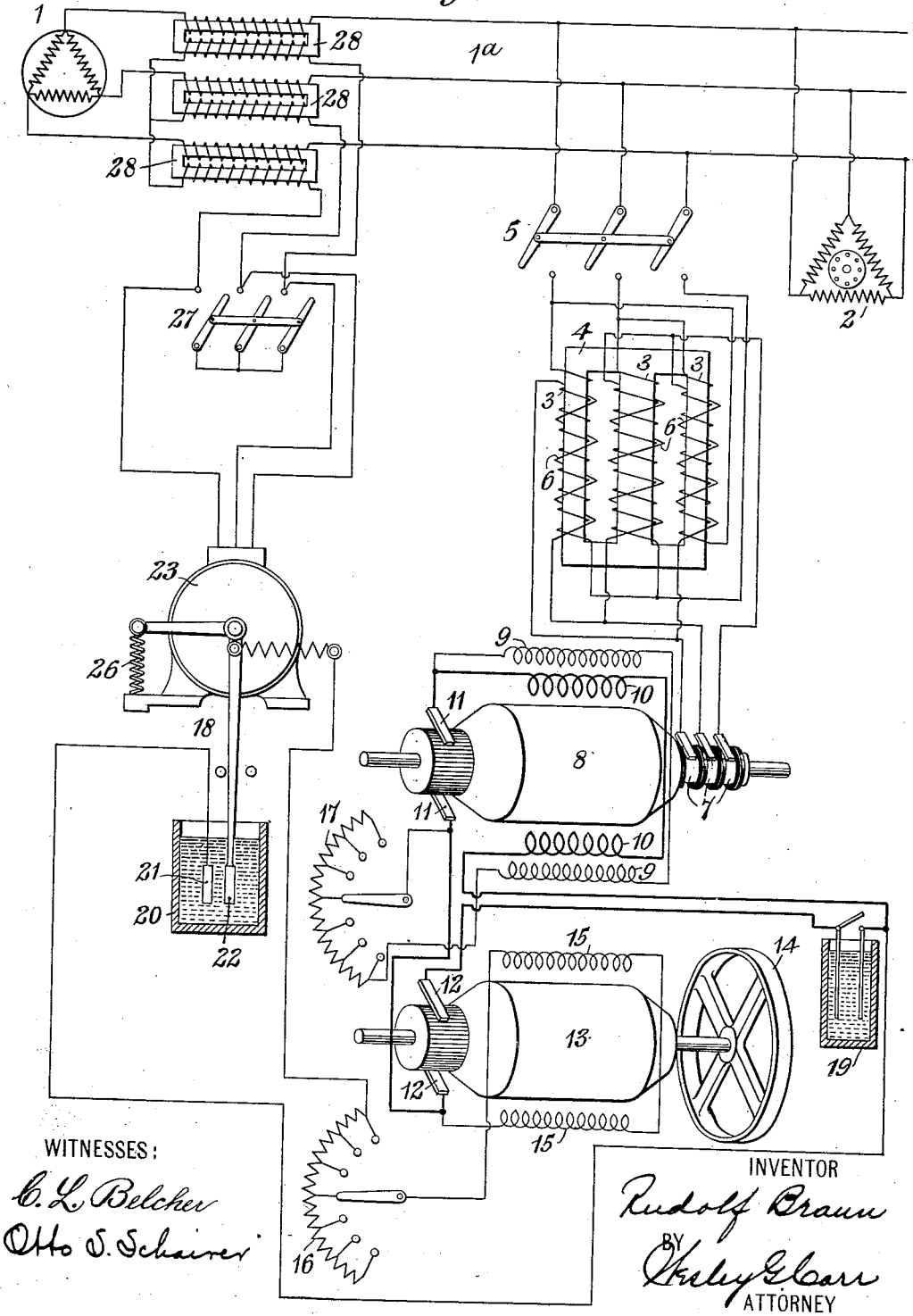
Figure 3:
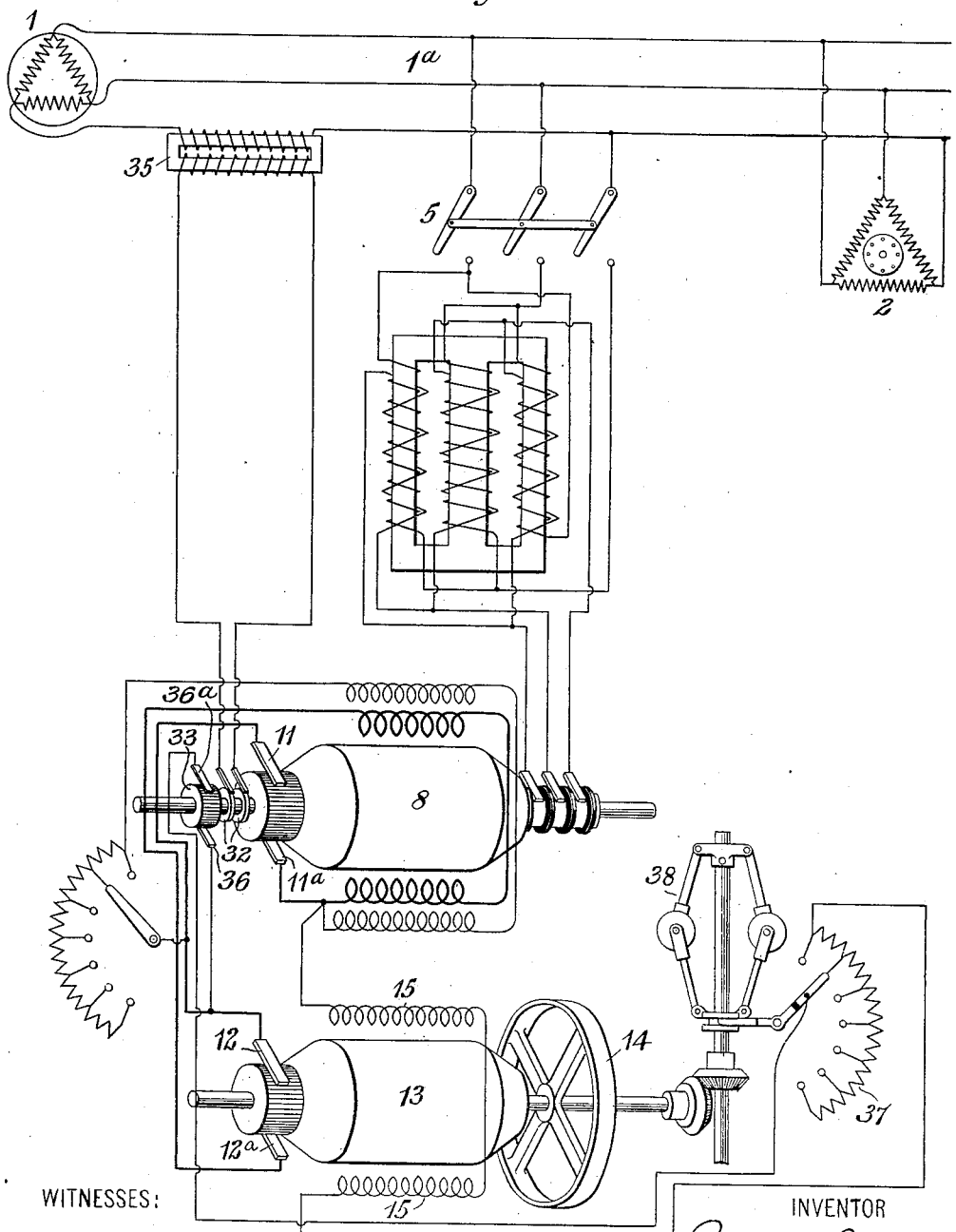

Figure 1 is a diagrammatic view of the connections of a load equalizer arranged to be manually regulated. Fig. 2 is a similar diagram of a modification in which the regulation is automatic, and Fig. 3 is a diagram similar to Fig. 2 showing another modification.

Referring now to Fig. 1, the source 1 of electrical energy is assumed to be at the left-hand end of the three-phase conductors 1ª which connect it to a load consisting of one or more motors or other translating devices 2. The primary winding 3 of a three-phase transformer or set of transformers 4 is connected through a switch 5 in any well known way to the line 1ª at a point intermediate the load and the generator 2, the secondary winding 6 of the transformer 4 being connected to slip rings 7 on the alternating current side of the rotary converter 8. The latter is provided with a shunt winding 9 and a series winding 10, the winding 9 being provided with a rheostat 17. The direct current brushes 11 of the rotary converter are connected to the brushes 12 of a shunt wound direct current machine 13 which is provided with a fly-wheel 14, the shunt field winding 15 of machine 13 being connected through a rheostat 16.

The operation of the system is as follows: When the rotary converter 8 is started and connected to the polyphase circuit 1ª, the shunt wound machine 13 will also start in the ordinary way as a motor until it reaches a speed corresponding to the excitation of its field; that is, a speed at which the counter-electromotive force at the brushes 12 is approximately equal to the electromotive force at the brushes 11, and when this point is reached, a small current only, corresponding to the no-load losses of the machine 13, will flow between the brushes 11 of the rotary converter 8 and the brushes 12. If the field excitation of the machine 13 is then increased it will produce (at this speed) a higher electromotive force at the brushes 12 than at the rotary converter brushes 11 and the machine 13 will act as a direct current generator, the rotary converter being thus compelled to convert from direct current to alternating current. If the field excitation of the machine 13 is decreased, the electromotive force at the brushes 12 will be less than that at the brushes 11 and the machine 13 will run as a motor, the rotary converter then operating to convert from alternating to direct current. It is therefore possible, by altering the field excitation of the machine 13, which can be done by adjustment of the rheostat 16, to cause the rotary converter 8 either to take power from the line 1ª or to deliver power thereto. The function of the fly-wheel 14 is to act as a reservoir of energy, its speed being decreased or increased according as the machine 13 is operating as a generator or motor. The maximum speed of the fly-wheel will thus correspond to the smallest field excitation of the machine 13 which can be produced by the regulator, and the minimum speed of the fly-wheel will be that corresponding to the greatest possible field excitation of this machine. It is evidently possible to vary the speed of the fly-wheel in this way to a very considerable extent, and, consequently, a smaller fly-wheel may be employed than is necessary with other systems designed for service similar to that of the present invention.

Owing to the fact that the machine 13 may be arranged to rotate at a very high speed, its field frame may be quite small, and an increase in size to allow for a larger variation of the total flux may be obtained without undue expense.

In order to obtain a variation of both the power factor and voltage in the transmission circuit, the rotary converter 8 has its field magnet provided with both shunt and series windings. The series windings 10 is arranged in such a manner that its ampere turns will oppose the ampere turns of the shunt winding 9 when the converter is operating to transform alternating current to direct current, and the resultant ampere turns are preferably made sufficient to have the rotary converter act under these conditions with 100 per cent. power factor at full load. When the converter is operating to transform from direct current to alternating current, the current in the series winding 10 will be reversed, and the ampere turns of the shunt and series windings will then assist each other, thereby overexciting the converter and producing on its alternating current side, that is to say, at the slip rings 7, an electromotive force that is leading with respect to the electromotive force of the transmission line. A leading current will thus be delivered to the supply circuit and will relieve the generator, in any desired degree, of wattless load at the load 2. The series winding 10 is arranged to have such a number of turns as will, in the manner outlined above, maintain the power factor of the load on the station, and therefore the station voltage, very nearly constant, notwithstanding that the load of the supply circuit and its power factor may vary within wide limits.

In order that the regulation may be automatic, the field magnet excitation of the shunt machine 13 must be varied in accordance with the magnitude and nature of the load; i. e., the resistance in the field magnet circuit of the shunt machine must be increased whenever the load in the supply circuit decreases, and the resistance in the field magnet circuit of the shunt machine must be decreased whenever the load in the supply circuit increases. One arrangement for effecting this result is illustrated in Fig. 2, in which the general construction of the load equalizer is the same as in Fig. 1, but an automatic regulating device 18 is connected in series with the shunt winding 15 of the direct current machine 13. In addition to this, a hand regulating starting resistance 19 and field rheostate 16 are provided, which, however, are not usually operated when the machine is running. The automatic regulator 18 consists of a liquid resistance contained in a tank 20, the amount of resistance interposed in the circuit being determined by the distance apart of two electrodes 21 and 22 connected in the circuit of the shunt field magnet winding 15. One electrode 21 is fixed while the other electrode 22 is arranged to be moved by a magnetic device 23. This magnetic device may be any form of suitable alternating current motor, and in Fig. 2 is shown, for example, as a small induction motor, the rotor of which tends to move the electrode 22 toward the electrode 21 against the action of a spring 26 when the primary winding of the motor is energized. The primary winding of the motor is connected, through a switch 27, to a set of series transformers 28 connected in the supply circuit 2, so that the torque tending to reduce the distance between the electrodes 21 and 22 is proportional to the load on the circuit. It will be readily understood that the motor 23 may be replaced by a wattmeter device, if desired, in which case shunt transformers connected across the supply circuit may also be required.

Fig. 3 shows another method of varying the excitation of the shunt field magnet of the direct current machine, so as to obtain automatic regulation, in which the general connections are the same as those shown in Fig. 2. The rotary converter 8 is provided with a rectifying device 31 comprising a pair of slip rings 32 connected to a commutator 33. The slip rings are provided with brushes connected to the terminals of the secondary winding of a series transformer or set of transformers 35 connected in one of the supply circuits. The commutator 33 is provided with brushes 36, 36ª of which the brush 36 is connected to the brush 12 of the direct current machine 13, and the other brush 36ª is connected, through an adjustable rheostat 37, to one terminal of the shunt field winding 15, the other terminal of which is connected to the brush 12ª or to the brush 11ª. The commutator 33 is thus connected in series with the shunt field magnet winding 15 so that the voltage impressed on the winding 15 will be the sum of the voltages at the brushes 12, 12$^a$, and 36, 36$^a$. The voltage at the brushes 36, 36$^a$, being obtained from the series transformer 35, will evidently depend upon the load on the supply circuit. The adjustable rheostat 37 is arranged to be adjusted in accordance with the speed of the machine 13 by a regulator 38, which may be a centrifugal regulator, as shown in the drawing, the regulator 38 being so mechanically coupled to the rotor of the machine 13 as to increase the resistance in the field magnet circuit with increase of speed.

The operation of the apparatus is as follows: If no current is flowing in the supply circuit, the excitation of the field magnet finding of the direct current machine 13 will depend only on the regulator 38, and will thus decrease as the speed increases, so that the counter electromotive force generated at the brushes 12, 12$^a$, will not increase proportionately to the increase of speed. Since a constant direct current voltage is impressed on the brushes 12, 12$^a$, from the brushes 11, 11$^a$, of the rotary converter 8, he rotor and fly-wheel of the machine 13 will continue to accelerate until all the resistance of the rheostat 37 has been interposed in the shunt field magnet winding circuit. The machine 13 will then be running at its maximum speed. When load comes on the supply circuit, the field magnet excitation of the machine 13 will be increased in proportion to the load, as explained above, and the voltage at the brushes 12, 12$^a$ will consequently rise above the voltage at the brushes 11, 11$^a$, and energy will be supplied to the circuit through the rotary converter until the speed of the fly-wheel has been sufficiently reduced to once more equalize the voltages at the brushes 12, 12$^a$, and 11, 11$^a$. In this condition; that is, with full load on the supply circuit, a portion only of the resistance 37 of the rheostat will be in circuit with the shunt field magnet winding 15; the rotor of the machine will then be rotating at a speed corresponding to the excitation of its field, and will continue to run at that speed so long as full load on the circuit continues. Any increase of load will increase the field excitation, and cause the machine 13 to operate as a generator, while any decrease of load will enable the speed of the machine to be increased.

It will be evident from the above that many variations from the methods of carrying out the invention herein described may be made without departing from the essential idea, and such descriptions are given by way of illustration only, and not by way of limitation.

I claim as my invention:

1. A load equalizer for an alternating current supply circuit comprising a rotary converter the alternating current winding of which is connected across the supply circuit at a point between the power station and the load, a shunt-wound direct current machine the brushes of which are connected to the direct current brushes of the rotary converter and the rotor of which is provided with a fly-wheel, and means for causing said machine to operate either as a motor or as a generator and at variable speeds in accordance with the load on the supply circuit, substantially as and for the purpose specified.

2. The combination with a main circuit, of a compound wound rotary converter having its alternating current end connected to said circuit between the generator and the load, a shunt wound direct current dynamo-electric machine having its armature electrically connected to the armature of the rotary converter, and means for varying the resistance of the shunt field magnet circuit of each machine.

3. The combination with a main circuit, of an equalizer comprising a compound wound rotary converter, a direct current dynamo-electric machine electrically coupled thereto and provided with a fly-wheel, and means for varying the resistance of the field magnet circuit of each of said machines.

4. The combination with a main circuit, of an equalizer comprising a rotary converter connected thereto, a direct current dynamo-electric machine electrically coupled to said rotary converter and provided with a fly-wheel, and means for automatically varying the field strength of the said machine as the load on the main circuit varies.

5. The combination with an alternating current circuit, of a load equalizer therefor comprising a rotary converter having its alternating current end connected to said circuit, a direct current dynamo-electric machine electrically coupled to said rotary converter and provided with a fly-wheel and means for automatically varying the field strength of one or both of said machines as the load on the main circuit varies.

In testimony whereof, I have hereunto subscribed my name this 6th day of September 1906.

RUDOLF BRAUN.

Witnesses:
 VICTOR SCHNEIDER,
 MAX RIEGER.